United States Patent
Cook et al.

(10) Patent No.: US 8,688,641 B1
(45) Date of Patent: Apr. 1, 2014

(54) PER USER AND PER PROCESS LAYER VISIBILITY

(75) Inventors: Randall R. Cook, Springville, UT (US); Jeremy K. Hurren, Pleasant Grove, UT (US); Jared G. Payne, Pleasant Grove, UT (US)

(73) Assignee: Symantec Operating Corporation, Mountain View, CA (US)

( * ) Notice: Subject to any disclaimer, the term of this patent is extended or adjusted under 35 U.S.C. 154(b) by 958 days.

(21) Appl. No.: 12/058,927

(22) Filed: Mar. 31, 2008

(51) Int. Cl.
*G06F 7/00* (2006.01)
*G06F 17/00* (2006.01)
*G06F 17/30* (2006.01)
*G06F 12/00* (2006.01)

(52) U.S. Cl.
USPC ............ 707/638; 707/695; 707/806; 707/821

(58) Field of Classification Search
None
See application file for complete search history.

(56) References Cited

U.S. PATENT DOCUMENTS

| | | | |
|---|---|---|---|
| 5,313,646 A | 5/1994 | Hendricks | 1/1 |
| 5,537,539 A | 7/1996 | Narihiro | 714/38 |
| 5,561,799 A | 10/1996 | Khalldi | 707/809 |
| 5,586,304 A | 12/1996 | Stupek, Jr. et al. | 710/170 |
| 5,905,990 A | 5/1999 | Inglett | 1/1 |
| 5,930,513 A | 7/1999 | Taylor | 717/174 |
| 5,933,647 A | 8/1999 | Aronberg et al. | 717/178 |
| 5,983,241 A * | 11/1999 | Hoshino | 1/1 |
| 5,991,402 A | 11/1999 | Jta | 705/59 |
| 5,991,753 A | 11/1999 | Wilde | 1/1 |
| 6,055,540 A | 4/2000 | Snow et al. | 1/1 |
| 6,161,218 A | 12/2000 | Taylor | 717/174 |
| 6,185,574 B1 | 2/2001 | Howard et al. | 1/1 |
| 6,195,650 B1 | 2/2001 | Gaither et al. | 707/999.001 |
| 6,356,915 B1 | 3/2002 | Chtchetkine et al. | 707/823 |
| 6,366,900 B1 | 4/2002 | Hu | 1/1 |
| 6,374,402 B1 | 4/2002 | Schmeidler et al. | 717/167 |
| 6,381,735 B1 | 4/2002 | Hunt | 717/158 |
| 6,453,468 B1 | 9/2002 | D'Souza | 717/168 |
| 6,519,626 B1 | 2/2003 | Soderberg et al. | 709/203 |
| 6,571,280 B1 | 5/2003 | Hubacher | |
| 7,013,289 B2 | 3/2006 | Horn et al. | 705/26 |
| 7,146,429 B2 | 12/2006 | Michel | 709/238 |
| 7,546,319 B1 | 6/2009 | Srinivasan et al. | 1/1 |

(Continued)

OTHER PUBLICATIONS

Jeff Tranter, "CD-ROM and Linux", Linux Journal, Nov. 11, 1994. Retrieved from the Internet:<URL:http://vvww.linuxjournal.com/article/2851.

(Continued)

*Primary Examiner* — Sherief Badawi
*Assistant Examiner* — Berhanu Mitiku
(74) *Attorney, Agent, or Firm* — Campbell Stephenson LLP

(57) ABSTRACT

A method is proposed. The method includes receiving a file operation request from a process and performing a census of instances of a file applicable to the file operation request to populate a data structure. The data structure including a listing of the instances of the file applicable to the file operation request. The data structure also includes characteristics for a first instance from among the instances of the file applicable to the file operation request, and characteristics for a second instance of a selected file from among the instances of the file applicable to the file operation request. The method also includes eliminating the first instance from among the instances of the file applicable to the file operation request on the basis of a rule associated with properties from a record for the process, and the characteristics for the first instance.

18 Claims, 9 Drawing Sheets

(56) References Cited

U.S. PATENT DOCUMENTS

| | | | |
|---|---|---|---|
| 2001/0014892 A1 | 8/2001 | Gaither et al. | 707/200 |
| 2002/0019941 A1 | 2/2002 | Chan et al. | 713/185 |
| 2002/0157089 A1 | 10/2002 | Patel et al. | 717/178 |
| 2002/0174215 A1 | 11/2002 | Schaefer | 709/224 |
| 2003/0033441 A1 | 2/2003 | Forin et al. | 719/315 |
| 2003/0233489 A1 | 12/2003 | Blaser et al. | 719/328 |
| 2003/0233490 A1 | 12/2003 | Blaser et al. | 719/328 |
| 2003/0233647 A1 | 12/2003 | Blaser et al. | 717/174 |
| 2004/0073691 A1 | 4/2004 | Sun | 709/230 |
| 2004/0098415 A1* | 5/2004 | Bone et al. | 707/200 |
| 2004/0267752 A1 | 12/2004 | Wong et al. | 707/9 |
| 2005/0091187 A1* | 4/2005 | Madhavarapu et al. | 707/1 |
| 2005/0097133 A1 | 5/2005 | Pham et al. | 707/104.1 |
| 2005/0165849 A1 | 7/2005 | Moradi et al. | 707/104.1 |
| 2005/0169073 A1 | 8/2005 | Cook et al. | 365/202 |
| 2005/0172279 A1 | 8/2005 | Cook et al. | 717/162 |
| 2005/0257265 A1 | 11/2005 | Cook et al. | 726/23 |
| 2005/0257266 A1 | 11/2005 | Cook et al. | 726/23 |
| 2006/0080353 A1 | 4/2006 | Miloushev et al. | 707/102 |
| 2006/0143703 A1 | 6/2006 | Hopen et al. | 726/15 |
| 2006/0206511 A1 | 9/2006 | Picon et al. | 707/102 |
| 2006/0282440 A1 | 12/2006 | Fletcher et al. | 707/100 |
| 2006/0288056 A1* | 12/2006 | Yamakawa et al. | 707/203 |
| 2009/0150462 A1 | 6/2009 | McClanahan et al. | 707/204 |
| 2010/0005072 A1 | 1/2010 | Pitts | 707/3 |

OTHER PUBLICATIONS

Jeff Tranter, "The Linux CD-ROM HOWTO", v. 1.2, Aug. 21, 1994. Retrieved from the Internet: http://v\r WW.ibiblio.org/pub/historic-linux/ftp-archives/sunsite.unc.edu/Nov-0 6-1994/docs/HOWTO/CDROM-HOWTO>.

ifs.5.1.tar.gz source code tarball, retrieved from the lntemet:<URL:httpΛ/www.ibiblio.org/pub/historic-linux/ftp-archives/tsx-11 .mitedu/Oct-07-1996/ALPHA/ifs/ >.

Newcomb, "Softricity has cure for app conflict blues", Thin Planet website, May 2002, parts 1 and 2, Jupitermedia Corp.

"SystemGuard", www.softricity.com website, Apr. 24, 2003 or earlier.

"SoftGrid for Windows Desktops Transforms Business Applications into Web-enabled services, reshaping the economics of enterprise . . . ", www.softricity.com website, Oct. 15, 2001.

"Softricity secures $14.6 million in oversubscribed third round venture funding", www.softricity.com website, May 28, 2002.

"Microsoft and Softricity announce agreement to manage existing Windows applications with web services", www.softricity.com website, May 28, 2002.

"Softricity announces SoftGrid 2.0 first customer deployments and general availability", www.softricity.com website, May 6, 2002.

"Softricity unveils SoftGrid Dual-Mode", www.softricity.com website, Mar. 24, 2003.

"Softricity becomes premier member of Citrix Business Alliance", www.softricity.com website, Feb. 25, 2002.

"SoftGrid Sequencer", www.softricity.com website, Apr. 24, 2003 or earlier.

Longwell, "Softricity lowers price on Dual-Mode deployments", www.crn.com website, Mar. 28, 2003.

"Microsoft and Softricity announce agreement to manage existing Windows-based applications with Web services", a Microsoft website, May 28, 2002.

"Softricity Data Sheet: Softricity SystemGuard: The foundation for stable on-demand application access", www.softricity.com website, Feb. 2002.

"Softricity Data Sheet: Softricity's patent-pending technology enables any application to run on any desktop . . . ", www.softricity.com website, Oct. 2002.

"Turning software into a service: there are no silver bullets", www.softricity.com website, Apr. 24, 2003 or earlier.

"Softricity acquires intellectual property of Seaport Software to extend virtual installation technology", www.choicesolutions.com website, Nov. 18, 2002.

"Softricity SoftGrid Platform: Softricity platform training guide", www.softricity.com website, Apr. 24, 2003 or earlier.

"Clean Slate", http://www.fortres.com/products/deansIate.htm, Jan. 13, 2004.

"FAQ-2001013", http://www.fortres.com/support/faqvJewarticle.asp?! D=2001013,Oct. 24, 2003.

"FAQ-2001014", http://www.fortres.com/support/faqvlewarticle.asp?! D=2001014,Nov. 25, 2003.

"FAQ-2001015", http://www.fortres.com/support/faqviewarticle,asp?ID=2001015,Nov. 23, 2003.

"FAQ-2001025", http://www.fortres.com/support/faqviewarticle.asp7ID-2001025,Dec. 15, 2003.

Fortres Grand Corporation, "Computer Security Software—A Lifesaver for Schools", www.fortres.com, May/Jun. 2001 (presumed from presented article: periodical not available).

"Clean Slate FAQ", http://www.fortres.com/products/cleanslate faq.htm, Jan. 13, 2004.

"Awards", http://www.fortres.eom/products/awards.htm#cieanslate, Jan. 13, 2004.

Microsoft Windows NT Resource Kit, 1993, Microsoft Press, vol. 1, pp. 325-346.

Heidemann, J.S., File-System Development with Stackable Layers, Feb. 1994, ACM Transactions on Computer Systems, vol. 12, No. 1, pp. 58-89.

* cited by examiner (Overall process)

(census)

(runtime eliminators)

(prioritzation)

US 8,688,641 B1

PER USER AND PER PROCESS LAYER VISIBILITY

BACKGROUND OF THE INVENTION

1. Field of the Invention

This invention relates to data storage and retrieval systems and, more particularly, to organization of access to data in data storage systems.

2. Description of the Related Art

Recent advances in the ability to multi-task a computing system have brought with them tremendous flexibility in the parallel performance of computing tasks. In addition to allowing a single user to run multiple simultaneous tasks, recent advances in multi-tasking allow multiple users to execute multiple tasks in parallel.

These same advances, however, have created unique problems in conflict management. Where multiple users are simultaneously reading and writing files, conflicts may exist as to who may view or write to a file. In some situations, the need to protect a file being written by a process handled by a first user from viewing by a process being run by a second user may present legal implications regarding the proliferation of information. Further, the prior art provides no adequate means for resolving conflicts in situations in which multiple processes running on the same system and sharing a storage device need to simultaneously access different versions of the same file.

SUMMARY OF THE INVENTION

A method is proposed. The method includes receiving a file operation request from a process and performing a census of instances of a file applicable to the file operation request to populate a data structure. The data structure including a listing of the instances of the file applicable to the file operation request. The data structure also includes characteristics for a first instance from among the instances of the file applicable to the file operation request, and characteristics for a second instance of a selected file from among the instances of the file applicable to the file operation request. The method also includes eliminating the first instance from among the instances of the file applicable to the file operation request on the basis of a rule associated with properties from a record for the process, and the characteristics for the first instance.

BRIEF DESCRIPTION OF THE DRAWINGS

A more complete understanding of the present invention may be acquired by referring to the following description and the accompanying drawings, in which like reference numbers indicate like features.

Figure 1:
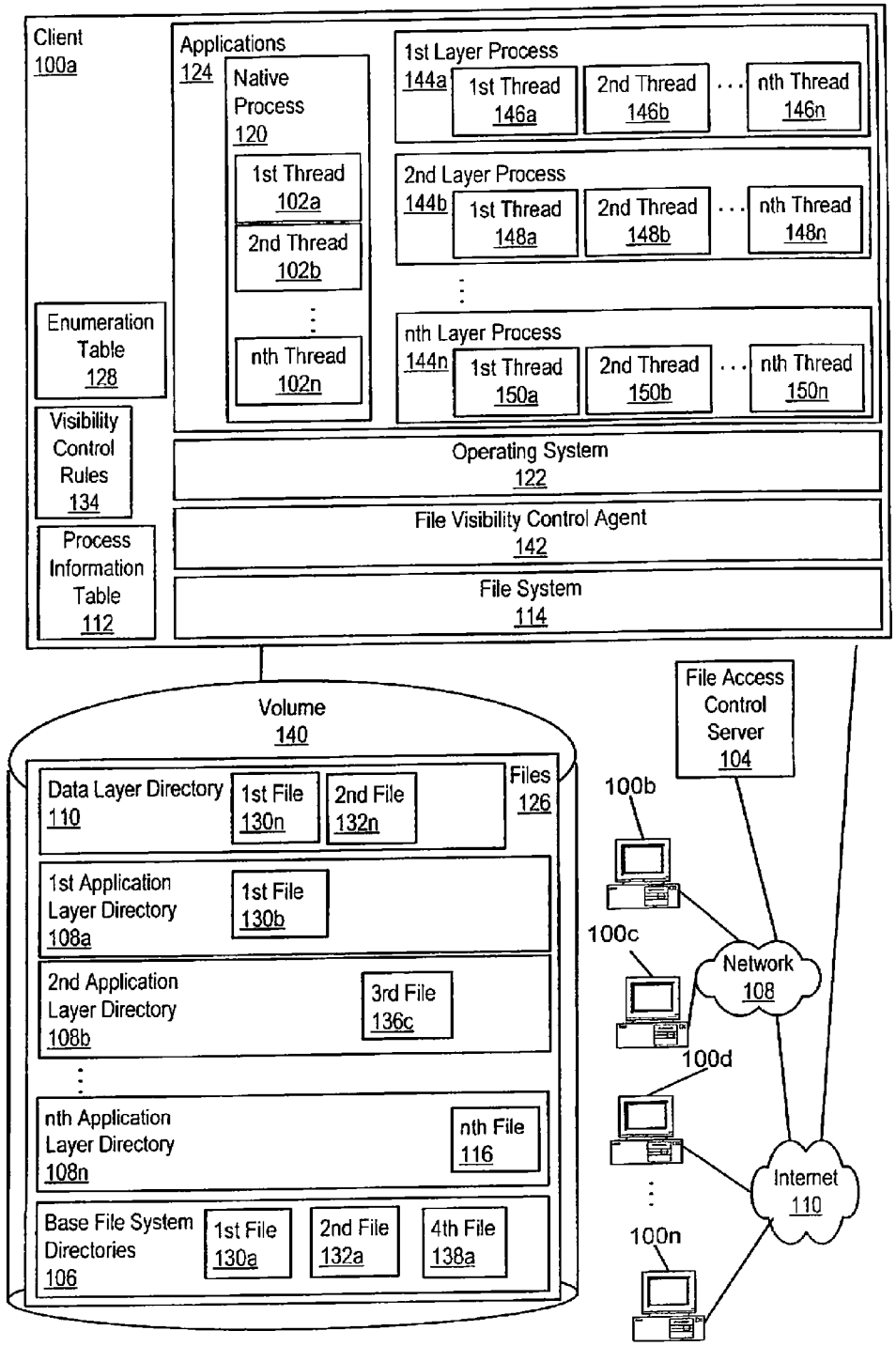
FIG. 1 illustrates a block diagram of a system for per-process and per-user visibility and access in automated file and disk organization systems, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The present invention provides a method, system and computer program product for providing per-process and per-user visibility and access in automated file and disk organization systems. More specifically, the present invention provides a method, system and computer program product to control visibility of files on a disk, allowing files to be seen only by selected users and processes in an organized, automated, and rule driven manner. In one embodiment of the present invention, a request for a file operation is sent to the file system. This request is intercepted by a file visibility control agent. The file visibility control agent examines the request and compiles a list, from the file system, of file instances possibly complying with the request. Some requests are eliminated, based on comparison of a set of characteristics, such as requesting process or requesting user, to a set of rules, and the remaining instances are sorted on the basis of a priority system. One of the instances is then provided to the operating system in response to the original request.

With reference now to the figures, and in particular with reference to FIG. 1 a block diagram of a system for per-process and per-user visibility and access in automated file and disk organization systems, according to one embodiment of the present invention, is depicted. FIG. 1 includes clients 100a-100n, a file access control server 104. Note that, where the numerical notation "n" is used in the present application, it is provided to indicate a plurality of objects, without necessarily specifying a consistent quantity between different instances of notation "n" or a correspondence between members of different pluralities labeled "n", though such correspondence or consistent quantity may exist in some embodiments of the present invention. The components in FIG. 1 enable the regulation of the storage, access and organization to achieve per-process and per-user visibility and access in automated file and disk organization systems for files on a plurality of clients 100*a* (and on similar clients 100*b*-100*n* through the use of a file access control server 104 and a file visibility control agent 142.

File access control server 104 and clients 100*b*-100*c* are coupled by a network 108. Client 100*a* can also connect directly to network 108. However, in this example, clients 101*a* and clients 100*d*-100*n* are instead coupled to network 108 by Internet 110. In one embodiment, client 100*a* can communicate with file access control server 104 (e.g., using a variety of techniques ranging from FTP and HTTP to email and instant messaging), even though client 100*a* does not have direct access to network 108.

Network 108 can include one or more WANs (Wide Area Networks), LANs (Local Area Networks), and/or one or more SANs (Storage Area Networks). Network 108 can include a WAN (Wide Area Network), such as the Internet, one or more LANs (Local Area Networks), and/or one or more SANs (Storage Area Networks). Network 108 is implemented using various media, including coaxial cables, fiber optic cables, and wireless links. In general, a preferred embodiment of network 108 presents a secure network that allows various computing devices to communicate with each other as well as with the system for performing automated file system and disk organization that includes file access control server 104. Network 108 may implement various security techniques, such as firewall techniques.

Client 100*a* is coupled to (or, alternatively, includes) a storage device, volume 140. Volume 140 is a physical or logical storage device that stores one or more files 126 in a set of a base file system directory 106 and a plurality of application layer directories 108*a*-108*n*, as well as a data layer directory 110. Volume 140 can include one or more physical storage devices (e.g., in one embodiment, volume 140 is implemented on a storage array that includes several independent hard drives). In one embodiment, applications 124 executing on client 100*a* can access (e.g., read and write) files 126 stored on volume 140 through the intervention of an operating system 122, file visibility control agent 142 and a file system 114. It is noted that in other embodiments, the information stored on volume 140 could be organized using data objects (e.g., database records, object-based storage, and the like) other than files and any of base file system directories 106, application layer directories 108*a*-108*n* and data layer directory 110 could be implemented as a plurality of directories without departing from the scope of the present invention. Through the use of visibility control rules 134, file visibility control agent 142 regulates the activity of file system 114 to provide per-process and per-user visibility of files 126.

Base file system directories 106 contain first file 130*a*, second file 132*a*, and fourth file 138*a*. Data layer directory 110 contains first file 130*n* and second file 132*n*. First application layer directory 108*a* contains first file 130*b*. Second application layer directory 108*b* contains third file 136*c*. Nth application layer directory 108 contains nth file 116. In one embodiment, each of base file system directories 106, application layer directories 108*a*-108*n* and data layer directory 110 will contain additional files omitted here for the sake of clarity in explanation.

In one embodiment, applications 124 include a native process 120 (or multiple native processes) with access to base file system directories 106*a* controlled by operating system 122. Applications 124 further include layer processes 144*a*-144*n*, each with access base file system directories 106, application layer directories 108*a*-108*n* and data layer directory 110 under the control of file visibility control agent 142. Properties of native process 120 and its threads 102*a*-102*n* are recorded in process information table 128. Likewise, properties of layer processes 144*a*-144*n* and threads 146*a*-146*n*, threads 148*a*-148*n*, and threads 150*a*-150*n*, respectively, are recorded in process information table 128.

In one embodiment of the present invention, applications 124 send a request for access to files 126 to operating system 122. Operating system 122 passes that request for access to file visibility control agent 142, which compares a characteristic of the requesting thread or process, or a user of the thread or process, to visibility control rules 134 to determine whether the request is acceptable under access rules 134. If the request violates access rules 134 by, for instance, specifying writing of a file 126 by a process not allowed to enjoy visibility of the file, then the request is denied. File system 114 interacts with volume 140 on the basis of accepted requests request and sends a result to file visibility control agent 142. File visibility control agent 142 then passes the result to operating system 122. Operating system 122 then forwards the result received from file visibility control agent 142 to applications 124.

Using the present invention, file visibility control agent 142 can regulate the visibility and access that any of layer processes 144*a*-144*n* and threads 146*a*-146*n*, threads 148*a*-148*n*, and threads 150*a*-150*n*, can achieve with respect to any of files 126. For instance, if first thread 146*a* requests first file 130 from among files 126, four instances of first file 130 (e.g., first file 130*n*, first file 130*b* and first file 130*a*) exist within files 136. The present invention allows file visibility control agent 142 to regulate, on the basis of a characteristic of first thread 146*a* or its user, the ability of each of first file 130*n*, first file 130*b* and first file 130*a* to be visible and accessible to first thread 146*a*. File visibility control agent 142 can, for instance, be configured to limit first thread 146*a* to accessing first file 130*b*.

In one embodiment, file visibility control agent 142 can act autonomously or under the control of file access control server 104. File access control server 104 is capable of regulating the behavior of file visibility control agent. In one embodiment, file visibility control agent 142 receives visibility control rules 134 from file access control server 104 and acts autonomously thereafter.

Figure 2:
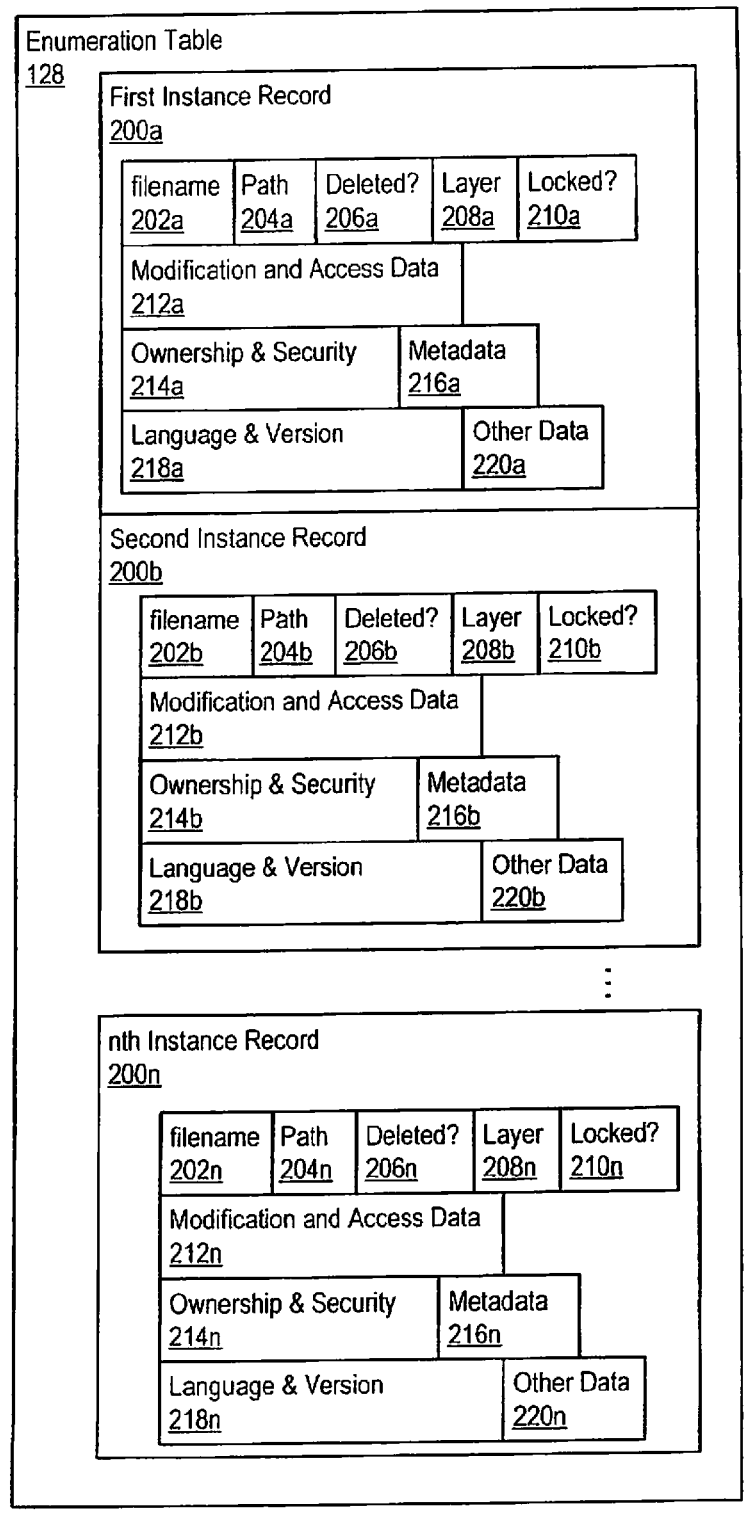
FIG. 2 depicts a block diagram of an instance enumeration table for per-process and per-user visibility and access in automated file and disk organization systems, according to one embodiment of the present invention.

FIG. 2 depicts a block diagram of an instance enumeration table for per-process and per-user visibility and access in automated file and disk organization systems, according to one embodiment of the present invention. In one embodiment, when ascertaining which versions of a file to make visible, file visibility control agent builds an enumeration table listing characteristics of different instances of a file 126. For example, first file 130*n*, first file 130*b*, and first file 130*a* are all instances of the same file that could be listed in an enumeration table 128 during the processing by file visibility control agent 142 of a request for first file 130.

In one embodiment, each of file instance records 200*a*-200*n* contains one of filename and extension fields 202*a*-202*n*, which provide descriptive identifiers of file 126, or in some embodiments, other data constructs, to which file records 200*a*-200*n* are associated. Each of file records 200*a*-200*n* contains one of path fields 204*a*-204*n*, indicating the location, such as data layer directory 110 on volume 140, from which an associated file 126 can be retrieved. Each of file records 200*a*-200*n* further contains one of deletion fields 206-206*n*, indicating, based on data from file visibility control agent 142, any particular processes which should show particular file instances represented by file records 200a-200n as having been deleted.

In one embodiment, each of file records 200a-200n also contains one of file layer data fields 208a-208n, indicating the identities of any layers currently accessing the file represented by file records 200a-200n. Each of file records 200a-200n further contains one of 'file locked' fields 208a-208n, indicating whether a thread or process has locked a file for editing. Each of file records 200a-200n further contains modification and access data 212-212n, which includes, by way of non-limiting example, the time and date of file modifications and accesses, modifying and accessing applications, and users modifying and accessing the files 126 covered by file records 200-200n. In one embodiment, each of file records 200-200a also contains file ownership and security data 214-214n, including, company and internal name data, which includes, by way of non-limiting example, the identity of an owner, the company of an owner and the group of an owner of the files 126 covered by file records 200-200n, as well as security and privilege information such as times during which the file can be accessed and users authorized to access the file. Each of file records 200-200n also contains metadata and file content data 216a-216n, which includes content and format indexing data. Each of file records 200a-200n also contains file language and version data 218a-218n, which contains product name, version and file language data.

Additionally, each of file records 200a-200n may contain other data 220a-220n, which will vary from embodiment to embodiment without departing from the scope of the present invention.

Figure 3:
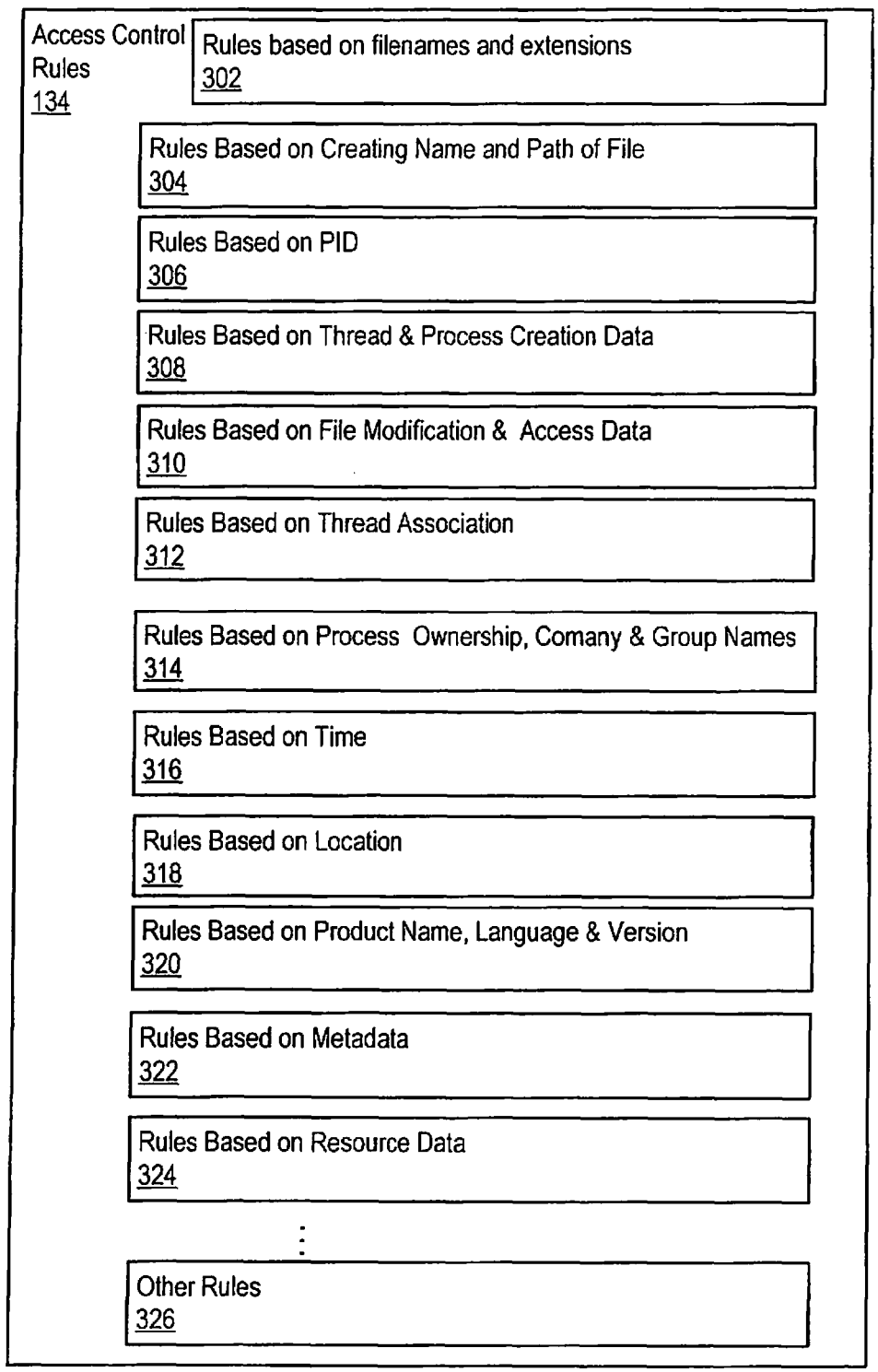
FIG. 3 illustrates a block diagram of an access rules data structure for per-process and per-user visibility and access in automated file and disk organization systems, according to one embodiment of the present invention.

FIG. 3 illustrates a block diagram of an access rules data structure for per-process and per-user visibility and access in automated file and disk organization systems, according to one embodiment of the present invention. In one embodiment, access rules data structure 134 contains rules 300-326 generated from user input to file access control server 104. Visibility control rules data structure 134 contains rules 300-326 for indicating, on the basis of characteristics of a file 126 or the process 146a-146n requesting the file, for determination by file visibility control agent 142, whether a file operation request is acceptable, and what actions should be taken in response to the request if it is not to be performed. An error, a substation or a redirection, may be invoked by file visibility control agent 142 in response to an unacceptable file operation request. As will, in light of the present disclosure, prove readily apparent to a person having ordinary skill in the relevant data processing or data storage arts, alternative embodiments of the present invention may use fewer, more or different rules 300-326 based on fewer, more or different characteristics without departing from the scope and intent of the present invention.

In one embodiment, each of rules 300-326 of access rules data structure 134 provides a rule individually dispositive of the question of whether a file operation request is acceptable, and what actions should be taken in response to the request if it is not to be performed. Alternative embodiments provide for combinations of rules 300-326 from access rules data structure 134, such as a point value for a scoring system used by file visibility control agent 142 to determine whether a file operation request is acceptable, and what actions should be taken in response to the request if it is not to be performed.

Rules based on filename and extension 302 indicate the impact of filenames 202a-202n and extensions on whether a file operation request sent by applications 124 is acceptable, and what actions should be taken in response to the request if it is not to be performed. As an example, in one embodiment of the present invention, a rule states that files 126 with the extension '.xyz' are to be made visible only to layer processes 144a-144n and threads 146a-150n identified with the XYZ file editor.

Rules based on file creating name and path of file 304 indicate the impact of file creation data on whether a file operation request sent by applications 124 is acceptable, and what actions should be taken in response to the request if it is not to be performed. For example, in one embodiment of the present invention, a rule states that files 126 created by a file called 'application7.0' are not to be made visible to processes spawned by 'application6.8'.

Rules based on file modification and process ID 306 indicate the impact of an ID of layer processes 144a-144n on whether a file operation request sent by applications 124 is acceptable, and what actions should be taken in response to the request if it is not to be performed. As an example, in one embodiment of the present invention, file visibility control agent 142 can create a rule stating that nth process 144a is ineligible to read $3^{rd}$ file 136c.

Similarly, rules based on thread and process creation data 308 indicate the impact of thread and process creation data on whether a file operation request sent by applications 124 is acceptable, and what actions should be taken in response to the request if it is not to be performed. For example, in one embodiment of the present invention, a rule states that files 126 created within the last three months can only be viewed by processes belonging to a finite list of users.

Rules based on file modification and access data 310 indicate the impact of content of file modification and access data 310 on whether a file operation request sent by applications 124 is acceptable, and what actions should be taken in response to the request if it is not to be performed. As an example, in one embodiment of the present invention, a rule states that file modified within the last three hours can only be viewed by processes belonging to a finite list of users of layer processes 144a-144n.

Similarly, rules based on thread association 312 indicate the impact of the processes layer processes 144a-144n to which threads 146a-150n are associated, or the spawning processes 144a-144n for requesting processes 144a-144n, on whether a file operation request sent by applications 124 is acceptable, and what actions should be taken in response to the request if it is not to be performed. For example, in one embodiment of the present invention, a rule states that processes 144a-144n spawned by a particular thread from among threads 146a-150n may not access nth file 116.

Likewise, rules based on process ownership 314 indicate the impact of product the user owners of process 144a-144n on whether a file operation request sent by applications 124 is acceptable, and what actions should be taken in response to the request if it is not to be performed. As an example, in one embodiment of the present invention, a rule states processes 144a-144n owned by some users may execute but not copy nth file 116.

Rules based on time 316 indicate the impact of date and time on whether a file operation request sent by applications 124 is acceptable, and what actions should be taken in response to the request if it is not to be performed. For example, in one embodiment of the present invention, a rule states that nth file 116 can only be accessed before a given date or during selected hours.

Rules based on location 318 indicate the impact geographic information on whether a file operation request sent by applications 124 is acceptable, and what actions should be taken in response to the request if it is not to be performed. For example, in one embodiment of the present invention, a rule states that that nth file 116 can only be accessed from processes 144a-144n originating on clients 100a-100n within a fixed list of countries.

Rules based on product name, language and version 320 indicate the impact product name, language and version information of files spawning processes 144a-144n on whether a file operation request sent by applications 124 is acceptable, and what actions should be taken in response to the request if it is not to be performed. For example, in one embodiment of the present invention, a rule states that nth file 116 can only be accessed by processes 144a-144n spawned by English language versions of a file.

Rules based on file metada 322 indicate the impact of file content and metadata on whether a file operation request sent by applications 124 is acceptable, and what actions should be taken in response to the request if it is not to be performed. For example, in one embodiment of the present invention, a rule states that a files 126 containing the word 'discipline' in metadata can only be reviewed by processes 144a-144n owned by a user identified as 'HR_supervisor'.

Rules based on resource data 324 indicate the impact of resource utilization on whether a file operation request sent by applications 124 is acceptable, and what actions should be taken in response to the request if it is not to be performed. For example, in one embodiment of the present invention, a rule states that nth file 116 can only be opened by processes 144a-144n on clients 100a-100n that indicate a requisite amount of available memory.

Finally, other rules 326, which will vary between embodiments of the present invention and be based on other data, indicate the impact of content of other data on whether a file operation request sent by applications 124 is acceptable, and what actions should be taken in response to the request if it is not to be performed.

Figure 4:
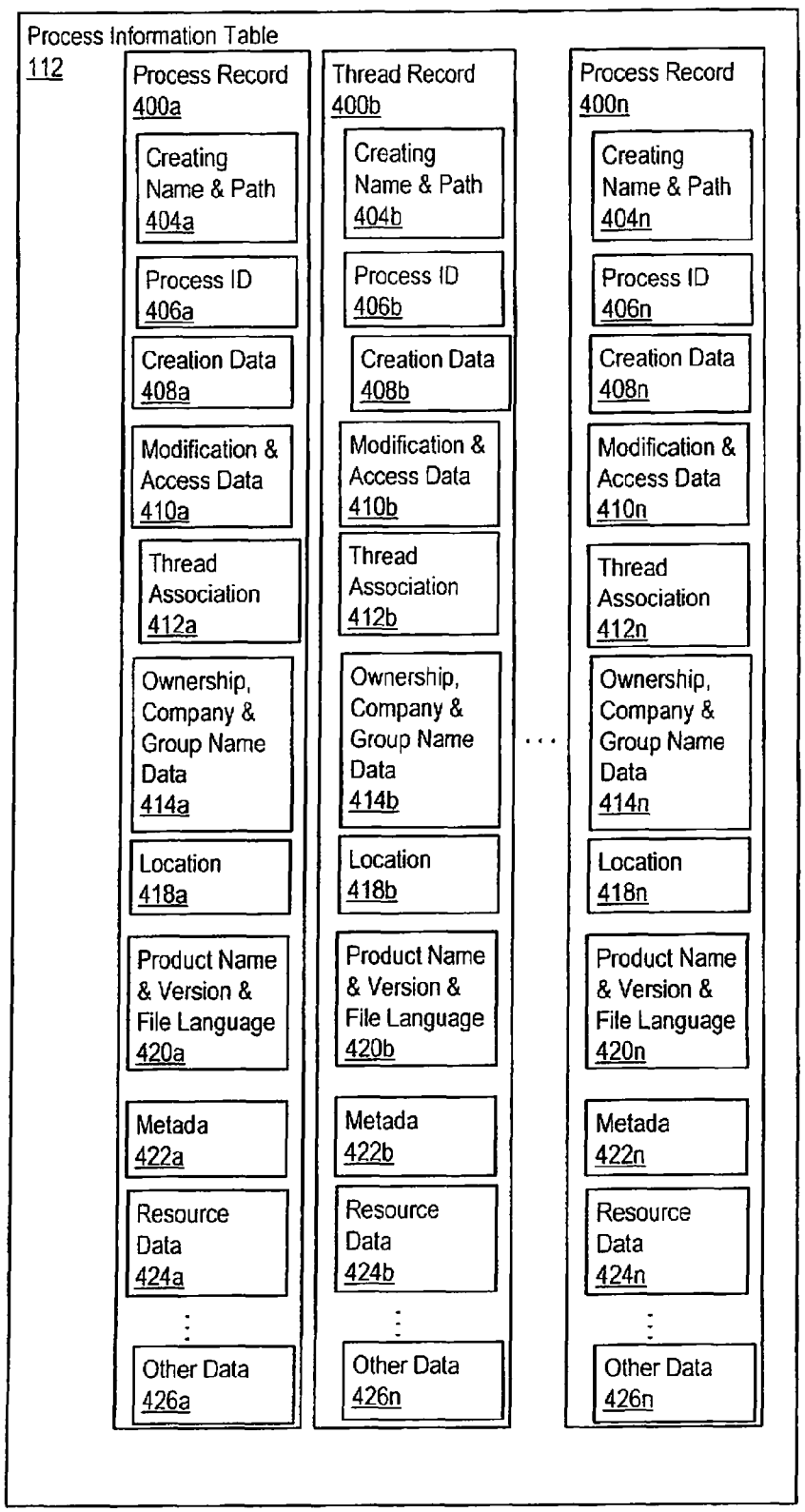
FIG. 4 depicts a block diagram of a process information table for per-process and per-user visibility and access in automated file and disk organization systems, according to one embodiment of the present invention.

FIG. 4 depicts a block diagram of a process information table for per-process and per-user visibility and access in automated file and disk organization systems, according to one embodiment of the present invention. Process information table 122 contains process or thread records 400a-400n representing processes 144a-144n or threads 146a-150n. Note that, where the numerical notation "n" is used in the present application, it is provided to indicate a plurality of objects, without necessarily specifying a consistent quantity between different instances of notation "n" or a correspondence between members of different pluralities labeled "n", though such correspondence or consistent quantity may exist in some embodiments of the present invention.

Each of process or thread records 400a-400n is associated with at least one of processes 144a-144n or threads 146a-150n and represents a record for file visibility control agent 142 to use in assessing whether a process or a thread (or a user thereof) can be made aware of and access a file 126. In the exemplary embodiment portrayed in FIG. 4, a large plurality of characteristics is recorded for each of process or thread records 400a-400n. As will, in light of the present disclosure, prove readily apparent to a person having ordinary skill in the relevant data processing or data storage arts, references with respect herein to threads and processes are used interchangeably, and alternative embodiments of the present invention may retain fewer, more or different characteristics within process and thread records 400a-400n without departing from the scope and intent of the present invention.

In one embodiment, each of process or thread records 400a-400n contains a creating filename and path 404a-404n, which provides a descriptive identifier of files 126, or in some embodiments, other data constructs, to which process or thread records 400a-400n are associated, which, in one embodiment, refers to the files 126 that created processes 144a-144n. Each of process or thread records 400a-400n contains a process ID 406a-406n, indicating the unique identifier that operating system 122 and file visibility control agent 142 use to communicate about processes 144a-144n or threads 146a-150n. Each of process or thread records 400a-400n further contains creation data 408a-408n associated with the time and circumstances under which the corresponding process 144a-144n threads 146a-150n was created.

In one embodiment, each of process or thread records 400a-400n also contains creation data 408-408(n), which includes, by way of non-limiting example, the time and date of process or thread creation, creating application, and creating user. Each of process or thread records 400a-400n further contains modification and access data 410a-410n, which includes, by way of non-limiting example, the time and date of file process modifications and accesses to files 126, transmission of data to other processes 144a-144n or threads 146a-150n, and users modifying and accessing the files 126 accessed or modified by processes 144a-144n or threads 146a-150n.

In one embodiment, each of process or thread records 400a-400n also contains process and thread association data 412a-412n, which includes, by way of non-limiting example, the identity of a processes 144a-144n or threads 146a-150n that created the processes 144a-144n or threads 146a-150n described by process or thread records 400a-400n. Each of process or thread records 400a-400n further includes process and thread ownership, company name and group name data 414a-414n, which includes, by way of non-limiting example, the identity o of an owner, the company of an owner and the group of an owner of the processes 144a-144n or threads 146a-150n described by process or thread records 400a-400n.

In one embodiment, each of process or thread records 400a-400n also contains location data 418a-418n, which includes, by way of non-limiting example, the location of a clients 100a-100n that created the processes 144a-144n or threads 146a-150n described by process or thread records 400a-400n. In one embodiment, each of process or thread records 400a-400n also contains product name, version and file language data 420a-420n for the files 126 that created the processes 144a-144n or threads 146a-150n described by process or thread records 400a-400n.

Each of process or thread records 400a-400n also contains metadata and file content data 422a-422n, which includes content and format indexing data for the files 126 that created the processes 144a-144n or threads 146a-150n described by process or thread records 400a-400n. Each of process or thread records 400a-400n also contains resource consumption data 424a-424n for processes 144a-144n or threads 146a-150n described by process or thread records 400a-400n. Additionally, each of process or thread records 400a-400n may contain other data 426a-420n, which will vary from embodiment to embodiment without departing from the scope of the present invention.

Figure 5:
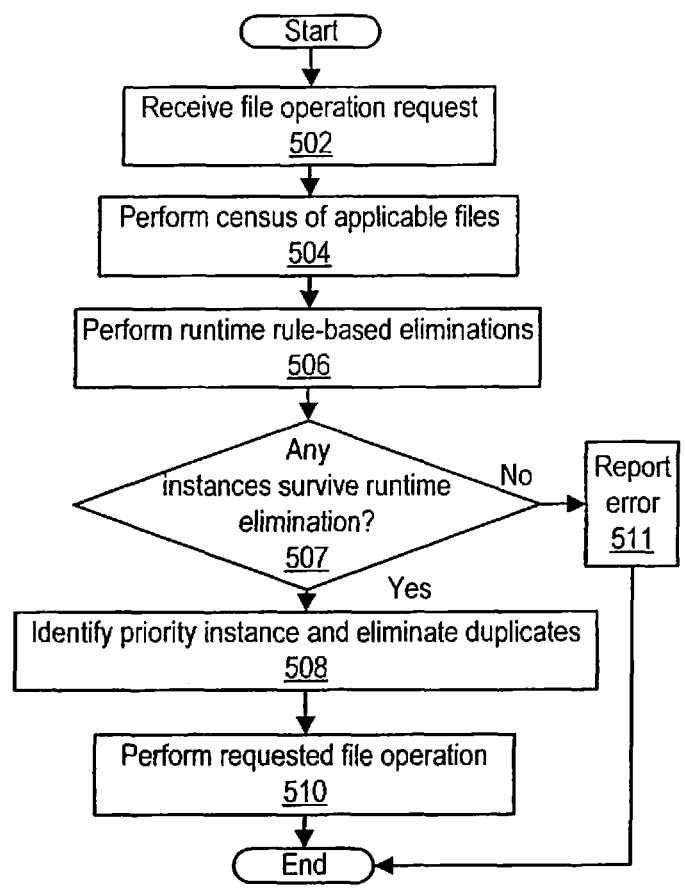
FIG. 5 is a flowchart of one embodiment of a method for providing per-process and per-user visibility and access in automated file and disk organization systems, according to one embodiment of the present invention.

FIG. 5 is a flowchart of one embodiment of a method for providing per-process and per-user visibility and access in automated file and disk organization systems, according to one embodiment of the present invention. After the process starts, the process moves to step 502, which depicts file visibility control agent 142 receiving a file operation request form operating system 122. The process then moves to step 504. Step 504 illustrates file visibility control agent 142 performing a census of available file instances from files 126 to generate an enumeration table 128.

In the example file set represented by files 126 illustrated in FIG. 1, a request from first layer process 144*a* to read first file 130 would result in an enumeration list identifying first file 130*a*, first file 130*b* and first file 130*n*. The process then proceeds to step 506, which depicts file visibility control agent performing runtime rule-based elimination using visibility control rules 134. The process next moves to step 507. Step 507 illustrates file visibility control agent 142 determining whether any instances survived the elimination process of step 506. If file visibility control agent 142 determines that no instances survived the elimination process of step 506, process then proceeds to step 511, which depicts file visibility control agent reporting an error to operating system 122. The process then ends.

Returning to step 507, if file visibility control agent 142 determines that instances survived the elimination process of step 506, process then proceeds to step 508. Step 508 illustrates file visibility control agent identifying a priority instance and eliminating duplicates. The process then proceeds to step 510, which depicts operating system 122 performing the requested file operation. The process then ends.

Figure 6:
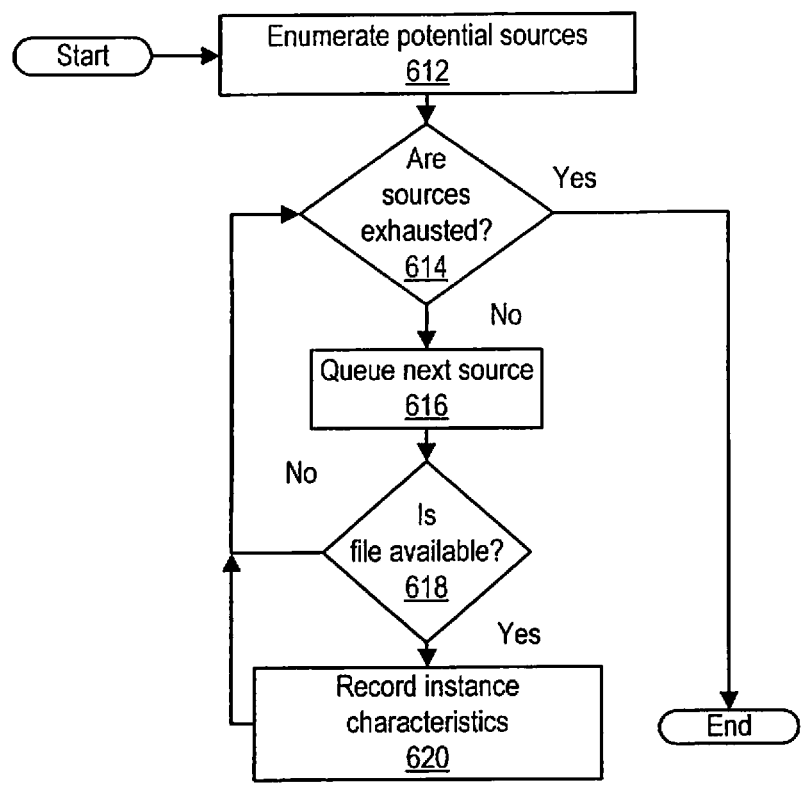
FIG. 6 is a flowchart of one embodiment of a method for performing an instance census in the context of providing per-process and per-user visibility and access in automated file and disk organization systems, according to one embodiment of the present invention.

FIG. 6 is a flowchart of one embodiment of a method for performing an instance census, as discussed in step 504 above, in the context of providing per-process and per-user visibility and access in automated file and disk organization systems, according to one embodiment of the present invention. After beginning, the process moves to step 612. Step 612 illustrates file visibility control agent 142 enumerating potential sources for files 126. The process then proceeds to step 614, which depicts file visibility control agent 142 determining whether potential sources enumerated in step 612 have been exhausted. If file visibility control agent 142 determining whether potential sources enumerated in step 612 have been exhausted, then the process ends. If, however, file visibility control agent 142 determining whether potential sources enumerated in step 612 have not been exhausted, then the process next moves to step 616. Step 616 depicts file visibility control agent 142 queuing a next source. The process then proceeds to step 618, which depicts file visibility control agent 142 determining whether the requested file is available. If file visibility control agent 142 determines that the requested file is not available, then the process returns to step 614, which is described above. If, however, file visibility control agent 142 determines that the requested file is available, then the process next moves to step 620, which depicts file visibility control agent 142 recording instance characteristics to enumeration table 128. The process then returns to step 614, which is described above.

Figure 7:
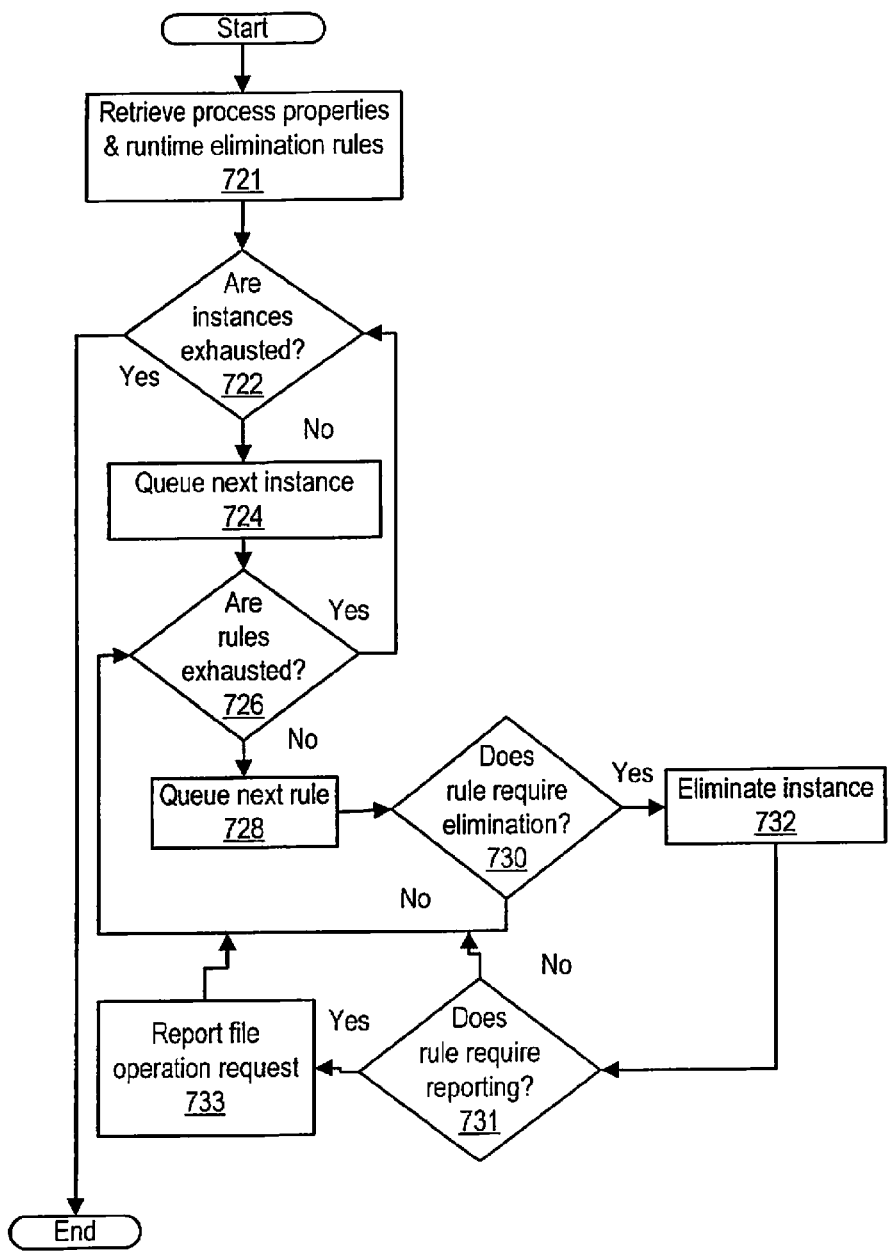
FIG. 7 is a flowchart of one embodiment of a method for performing runtime elimination in the context of providing per-process and per-user visibility and access in automated file and disk organization systems, according to one embodiment of the present invention.

FIG. 7 is a flowchart of one embodiment of a method for performing runtime elimination in the context of providing per-process and per-user visibility and access in automated file and disk organization systems, according to one embodiment of the present invention. After the process begins, the process proceeds to step 721. Step 721 illustrates file visibility control agent 142 retrieving process properties and runtime elimination rules, also called visibility control rules 134. The process next proceeds to step 722, which depicts file visibility control agent 142 determining whether instances for a particular file operation are exhausted. If file visibility control agent 142 determines that instances for a particular file operation are exhausted, the process then ends. If, however, file visibility control agent 142 determines that instances for a particular file operation are not exhausted, the process next moves to step 724. Step 724 illustrates file visibility control agent queuing a next instance for comparison to visibility control rules 134.

The process then proceeds to step 726, which depicts file visibility control agent 142 determining whether all rules from visibility control rules 134 are exhausted. If file visibility control agent 142 determines that all rules from visibility control rules 134 are exhausted, then the process returns to step 722, which is described above. If, however, file visibility control agent 142 determines that all rules from visibility control rules 134 are not exhausted, then the process next moves to step 728. Step 728 illustrates file visibility control server queuing a next rule from among visibility rules data structure 134.

The process then proceeds to step 730, which depicts file visibility control agent 142 determining whether the selected rule from among file visibility control rules 132 require elimination of the file instance queued in step 724 from enumeration table 128. If file visibility control agent 142 determines that the selected rule from among file visibility control rules 132 does not require elimination of the file instance queued in step 724 from enumeration table 128, then the process returns to step 726, which is described above. If, however, file visibility control agent 142 determines that the selected rule from among file visibility control rules 132 requires elimination of the file instance queued in step 724 from enumeration table 128, then the process proceeds to step 732. Step 732 illustrates file access control agent 142 eliminating from enumeration table the instance queued in step 724. The process then proceeds to step 731. Step 731 illustrates file visibility control engine 142 determining whether the removal accomplished in step 732 requires reporting to operating system 122. If file visibility control engine 142 determines that the removal accomplished in step 732 does not require reporting to operating system 122, then the process proceeds to step 726, which is described above. If, however, file visibility control engine 142 determines that the removal accomplished in step 732 requires reporting to operating system 122, then the process proceeds to step 733, which depicts file visibility control engine 142 reporting to operating system 122 the removal accomplished in step 732. The process then returns to step 726, which is described above.

Figure 8:
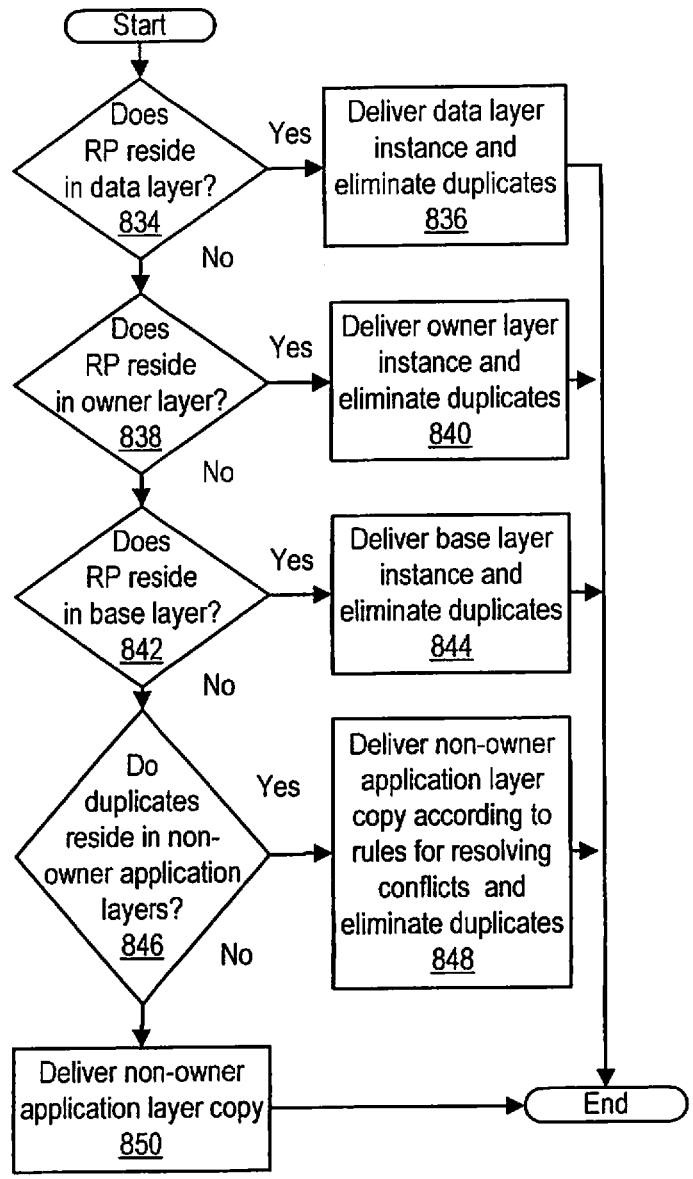
FIG. 8 is a flowchart of one embodiment of a method for prioritizing file instances and eliminating duplicates in the process of providing per-process and per-user visibility and access in automated file and disk organization systems, according to one embodiment of the present invention.

FIG. 8 is a flowchart of one embodiment of a method for prioritizing file instances and eliminating duplicates in the process of providing per-process and per-user visibility and access in automated file and disk organization systems, according to one embodiment of the present invention. After the process begins, the process proceeds to step 834, which illustrates file visibility control engine 142 determining whether an instance of the requested file resides in a data layer directory 110. If file visibility control engine 142 determines that an instance of the requested file resides in a data layer directory 110, then the process next moves to step 836. Step 836 illustrates file visibility control engine 142 delivering the instance of the requested file that resides in a data layer directory 110 and eliminating from consideration all other duplicates from enumeration table 128. The process then ends.

Returning to step 834, if file visibility control engine 142 determines that an instance of the requested file does not reside in a data layer directory 110, then the process next moves to step 838. Step 838 illustrates file visibility control engine 142 determining whether an instance of the requested file resides in a layer owning the layer process having sent the file operation request. If file visibility control engine 142 determines that an instance of the requested file resides in a layer owning the layer process having sent the file operation request, then the process proceeds to step 840, which depicts file visibility control engine 142 delivering the instance of the requested file that resides in the layer directory owning the layer process having sent the file operation request and eliminating from consideration all other duplicates from enumeration table 128. The process then ends.

Returning to step 838, if file visibility control engine 142 determines that an instance of the requested file does not reside in a layer owning the layer process having sent the file operation request, then the process next moves to step 842. Step 842 illustrates file visibility control engine 142 determining whether an instance of the requested file resides in a base file system directory 106. If file visibility control engine 142 determines that an instance of the requested file resides in a base file system directory 106, then the process proceeds to step 844, which depicts file visibility control engine 142 delivering the instance of the requested file that resides base file system directory 106 and eliminating from consideration all other duplicates from enumeration table 128. The process then ends.

Returning to step 842, if file visibility control engine 142 determines that an instance of the requested file resides in a base file system directory 106, then the process proceeds to step 846. Step 846 depicts file visibility control engine 142 determining whether duplicates reside in application layer directories other than the owner of the process requesting the file operation. If visibility control engine 142 determines that duplicates do not reside in application layer directories other than the owner of the process requesting the file operation, then the process proceeds to step 850. Step 850 depicts file visibility control engine delivering the non-owner application layer copy to operating system 122. The process then ends. Returning to step 846, if visibility control engine 142 determines that duplicates reside in application layer directories other than the owner of the process requesting the file operation, then the process proceeds to step 848. Step 848 illustrates visibility control engine 142 invoking conflict resolution rules and delivering a non-owner application layer copy to operating system 122. The process then ends.

Figure 9:
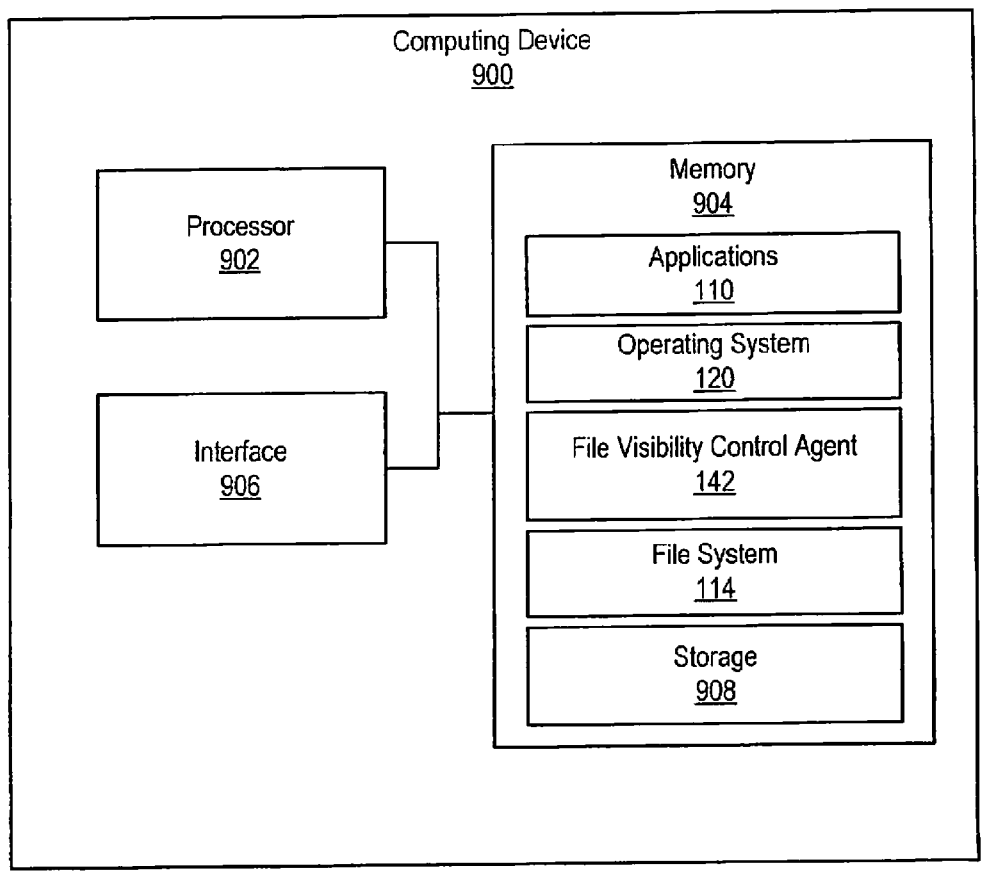
FIG. 9 depicts a block diagram of a computer system configured for performing providing per-process and per-user visibility and access in automated file and disk organization systems, according to one embodiment of the present invention.

FIG. 9 depicts a block diagram of a computer system configured for performing automated file system and disk organization, according to one embodiment of the present invention. Computing device 900 can implement client 100*a* or file visibility control server 104 of FIG. 1. One skilled in the art will, in light of this disclosure, quickly ascertain that computing device 900 may also, with modifications.

As illustrated, computing device 900 includes one or more processors 902 (e.g., microprocessors, PLDs (Programmable Logic Devices), or ASICs (Application Specific Integrated Circuits)) configured to execute program instructions stored on or in a computer-readable medium such as memory 904. Memory 904 can include various types of RAM (Random Access Memory), ROM (Read Only Memory), Flash memory, MEMS (Micro Electro-Mechanical Systems) memory, and the like. Computing device 900 also includes one or more interfaces 906. Processor 902, memory 904, and interface 906 are coupled to send and receive data and control signals by a bus or other interconnect.

Interface(s) 906 can include an interface to a storage device on which information to be backed up or restored is stored. Interface(s) 906 can also include an interface to a network (e.g., network 108 or Internet 110 of FIG. 1) for use in communicating with a server.

The program instructions and data implementing backup applications 124, file visibility control agent 142, file system 114 and operating system 122 can be stored on various computer readable media such as memory 904. In some embodiments, such software is stored on a computer readable storage medium such as a CD (Compact Disc), DVD (Digital Versatile Disc), hard disk, optical disk, tape device, floppy disk, and the like). In order be executed by processor 902, the instructions and data implementing file system 114, applications 124, file visibility control agent 142 and operating system 122 are loaded into memory 904 from the other computer readable medium. The instructions and/or data can also be transferred to computing device 900 for storage in memory 904 via a network such as the Internet or upon a carrier medium. In some embodiments, a computer readable medium is a carrier medium such as a network and/or a wireless link upon which signals such as electrical, electromagnetic, or digital signals, on which the data and instructions implementing file system 114, applications 124, file visibility control agent 142 and operating system 122 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a file operation request from a process;
a computer system performing a census of instances of a file applicable to said file operation request to populate a data structure, wherein
said data structure comprises a listing of said instances, and
said data structure further comprises characteristics for a first instance from among said instances and characteristics for a second instance from among said instances;
determining whether the first and second instances are to be made visible to said process, wherein
said determining comprises
determining whether said file operation request is acceptable according to a rule, and
if said file operation request is acceptable, determining whether the first and second instances are to be made visible to said process by comparing characteristics of said first and second instances with characteristics of said rule, and
said rule corresponds to said process;
making said first instance non-visible to said process on the basis of a determination that said first instance does not satisfy said rule; and
selecting for performance of said file operation request said second instance, wherein
said selecting comprises
selecting said second instance responsive to ascertaining that said second instance resides in a data layer,
selecting said second instance responsive to ascertaining that said second instance resides in an owner layer for said process,
selecting said second instance responsive to ascertaining that said second instance resides in a base file system for a client in which said process is a native process, and
selecting said second instance responsive to ascertaining that said second instance resides in a non-owner application layer and another rule for resolving conflicts indicates said selecting.

2. The method of claim 1, wherein
said performing said census further comprises a file visibility control agent querying a file system to discover said characteristics for said first instance.

3. The method of claim 1, wherein said performing said census further comprises:
  enumerating potential sources for said instances;
  determining that one of said potential sources comprises said first instance; and
  recording said characteristics for said first instance.

4. The method of claim 1, wherein said characteristics for said first instance further comprise a plurality of:
  a path of said first instance,
  a filename of said first instance,
  an indication of deletion of said first instance,
  an indication of said owner layer of said first instance,
  an indication that said first instance is locked,
  an item of modification and access data for said first instance,
  an item of ownership data for said first instance,
  an item of security data for said first instance,
  an item of language data for said first instance,
  an item of version data for said first instance, and
  an item of metadata for said first instance.

5. The method of claim 1, wherein
  said characteristics of said rule are identified within a record for said process.

6. The method of claim 5, wherein said making said first instance non-visible further comprises:
  retrieving said characteristics of said rule from said record for said process;
  retrieving said rule;
  responsive to determining that said first instance is to be made non-visible to said process, removing said first instance from among said instances; and
  responsive to determining that said rule requires reporting of said file operation request, reporting said file operation request.

7. The method of claim 5, wherein said characteristics of said rule comprise a plurality of:
  a creating name and path of said process,
  a process identifier,
  items of creation data for said process,
  a list of files that said process has accessed or modified,
  a thread association for said process,
  an owner of said process,
  a group of said owner,
  a company of said owner,
  an item of metadata associated with said process,
  an item of data indicating resources consumed by said process,
  a product that created said process,
  a version of said product, and
  a language of said product.

8. The method of claim 5, wherein said characteristics of said rule comprise a plurality of:
  a creating name and path of said process,
  a process identifier,
  items of creation data for said process,
  a list of files that said process has accessed or modified,
  a thread association for said process,
  an owner of said process,
  a group of said owner,
  a company of said owner,
  an item of metadata associated with said process,
  an item of data indicating resources consumed by said process,
  a product that created said process,
  a version of said product,
  a language of said product,
  a path of said first instance,
  a filename of said first instance,
  an indication of deletion of said first instance,
  an indication of said owner layer of said first instance,
  an indication that said first instance is locked,
  an item of modification and access data for said first instance,
  an item of ownership data for said first instance,
  an item of security data for said first instance,
  an item of language data for said first instance,
  an item of version data for said first instance,
  an item of metadata for said first instance,
  a location of a system executing said process, and
  a time of said file operation request.

9. An apparatus comprising:
  a processor; means for causing said processor to receive a file operation request from a process;
  means for causing said processor to perform a census of instances of a file applicable to said file operation request to populate a data structure, wherein
    said data structure comprises a listing of said instances, and
    said data structure further comprises characteristics for a first instance from among said instances and characteristics for a second instance from among said instances;
  means for causing said processor to determine whether the first and second instances are to be made visible to said process, wherein
    said determine causes said processor to
      determine whether said file operation request is acceptable according to a rule, and
      if said file operation request is acceptable, determine whether the first and second instances are to be made visible to said process by comparing characteristics of said first and second instances with characteristics of said rule, and
    said rule corresponds to said process;
  means for causing said processor to make said first instance non-visible to said process on the basis of a determination that said first instance does not satisfy said rule; and
  means for causing said processor to select for performance of said file operation request said second instance,
    said select causes said processor to
      select said second instance responsive to ascertaining that said second instance resides in a data layer,
      select said second instance responsive to ascertaining that said second instance resides in an owner layer for said process,
      select said second instance responsive to ascertaining that said second instance resides in a base file system for a client in which said process is a native process, and
      select said second instance responsive to ascertaining that said second instance resides in a non-owner application layer and another rule for resolving conflicts indicates said selecting.

10. The apparatus of claim 9, wherein said means for causing said processor to perform said census further comprise:
  means for querying a file system to discover said characteristics for said first instance.

11. The apparatus of claim 9, wherein
  said characteristics of said rule are identified within a record for said process.

12. The apparatus of claim 11, wherein said means for causing said processor to make said first instance non-visible further comprise:

means for causing said processor to retrieve said characteristics of said rule from said record for said process;

means for causing said processor to retrieve said rule;

means for causing said processor to, responsive to determining that said first instance is to be made non-visible to said process, remove said first instance from among said instances; and means for causing said processor to, responsive to determining that said rule requires reporting of said file operation request, report said file operation request.

13. A computer program product comprising:

a non-transitory computer-readable medium;

instructions on the non-transitory computer-readable medium for receiving a file operation request from a process;

instructions on the non-transitory computer-readable medium for performing a census of instances of a file applicable to said file operation request to populate a data structure, wherein said data structure comprises a listing of said instances, and said data structure further comprises characteristics for a first instance from among said instances and characteristics for a second instance from among said instances;

instructions on the non-transitory computer-readable medium for determining whether the first and second instances are to be made visible to said process, wherein said determining comprises determining whether said file operation request is acceptable according to a rule, and if said file operation request is acceptable, determining whether the first and second instances are to be made visible to said process by comparing characteristics of said first and second instances with characteristics of said rule, and said rule corresponds to said process;

instructions on the non-transitory computer-readable medium for making said first instance non-visible to said process on the basis of a determination that said first instance does not satisfy said rule; and instructions on the non-transitory computer-readable medium for selecting for performance of said file operation request said second instance, wherein said selecting comprises selecting said second instance responsive to ascertaining that said second instance resides in a data layer, selecting said second instance responsive to ascertaining that said second instance resides in an owner layer for said process, selecting said second instance responsive to ascertaining that said second instance resides in a base file system for a client in which said process is a native process, and selecting said second instance responsive to ascertaining that said second instance resides in a non-owner application layer and another rule for resolving conflicts indicates said selecting.

14. The computer program product of claim 13, wherein said instructions on the non-transitory computer-readable medium for performing said census further comprise:

instructions on the non-transitory computer-readable medium for querying a file system to discover said characteristics for said first instance.

15. The computer program product of claim 13, wherein said instructions on the non-transitory computer-readable medium for performing said census further comprise:

instructions on the non-transitory computer-readable medium for enumerating potential sources for said instances;

instructions on the non-transitory computer-readable medium for determining that one of said potential sources comprises said first instance; and instructions on the non-transitory computer-readable medium for recording said characteristics for said first instance.

16. The computer program product of claim 13, wherein said characteristics of said rule are identified within a record for said process.

17. The computer program product of claim 16, wherein said instructions on the non-transitory computer-readable medium for making said first instance non-visible further comprise:

instructions on the non-transitory computer-readable medium for retrieving said characteristics of said rule from said record for said process;

instructions on the non-transitory computer-readable medium for retrieving said rule;

instructions on the non-transitory computer-readable medium for, responsive to determining that said first instance is to be made non-visible to said process, removing said first instance from among said instances; and instructions on the non-transitory computer-readable medium for, responsive to determining that said rule requires reporting of said file operation request, reporting said file operation request.

18. The computer program product of claim 13, wherein said characteristics for said first instance further comprise a plurality of:

a path of said first instance, a filename of said first instance, an indication of deletion of said first instance, an indication of said owner layer of said first instance, an indication that said first instance is locked, an item of modification and access data for said first instance, an item of ownership data for said first instance, an item of security data for said first instance, an item of language data for said first instance, an item of version data for said first instance, and an item of metadata for said first instance.

* * * * *